(12) United States Patent
Katsuyama et al.

(10) Patent No.: US 10,408,999 B2
(45) Date of Patent: Sep. 10, 2019

(54) MULTIPLEXER

(71) Applicant: NATIONAL UNIVERSITY CORPORATION UNIVERSITY OF FUKUI, Fukui, Fukui (JP)

(72) Inventors: Toshio Katsuyama, Fukui (JP); Akira Nakao, Fukui (JP)

(73) Assignee: NATIONAL UNIVERSITY CORPORATION UNIVERSITY OF FUKUI, Fukui (JP)

(*) Notice: Subject to any disclaimer, the term of this patent is extended or adjusted under 35 U.S.C. 154(b) by 0 days.

(21) Appl. No.: 16/211,879

(22) Filed: Dec. 6, 2018

(65) Prior Publication Data

US 2019/0107675 A1    Apr. 11, 2019

Related U.S. Application Data

(60) Continuation-in-part of application No. 15/866,743, filed on Jan. 10, 2018, now Pat. No. 10,185,091,
(Continued)

(30) Foreign Application Priority Data

May 9, 2014    (JP) ................................. 2014-097561

(51) Int. Cl.
     *G02B 6/12*      (2006.01)
     *G02B 6/26*      (2006.01)
(Continued)

(52) U.S. Cl.
CPC ........... *G02B 6/12007* (2013.01); *G02B 6/12* (2013.01); *G02B 6/122* (2013.01); *G02B 6/124* (2013.01);
(Continued)

(58) Field of Classification Search
None
See application file for complete search history.

(56) References Cited

U.S. PATENT DOCUMENTS 5,802,222 A    9/1998   Rasch et al.
6,052,222 A    4/2000   Kitamura
(Continued)

FOREIGN PATENT DOCUMENTS

CN    102292672 A    12/2011
CN    102449520 A    5/2012
(Continued)

OTHER PUBLICATIONS

International Search Report dated May 19, 2015, issued in counterpart International Application No. PCT/JP2015/056560 (2 pages.).
(Continued)

*Primary Examiner* — Michelle R Connelly
(74) *Attorney, Agent, or Firm* — Westerman, Hattori, Daniels & Adrian, LLP

(57) ABSTRACT

To provide a multiplexer that makes it possible to achieve a reduction in size and that minimizes the influence of the expansion of laser light on a multiplexing unit. A multiplexer is provided with a plurality of waveguides, multiplexing units that are provided at an intermediate location within the waveguides, and laser light sources, wherein: the first multiplexing unit is arranged at a position that is closest to the laser light sources; and the laser light sources that have an optical axis at a position that is separated from the transmission axis of the visible light that is introduced into the first multiplexing unit are arranged so that the optical axis is inclined with respect to the transmission axis and the outer periphery of laser light that expands at a predetermined expansion angle passes in front of the first multiplexing unit.

4 Claims, 13 Drawing Sheets

Related U.S. Application Data which is a division of application No. 15/309,594, filed as application No. PCT/JP2015/056560 on Mar. 5, 2015, now Pat. No. 9,952,389.

(51) Int. Cl.

| | | |
|---|---|---|
| *H04N 9/31* | (2006.01) | |
| *G02B 6/293* | (2006.01) | |
| *G02B 26/10* | (2006.01) | |
| *G03B 21/20* | (2006.01) | |
| *G02B 6/125* | (2006.01) | |
| *G02B 6/124* | (2006.01) | |
| *G02B 6/122* | (2006.01) | |
| *G02B 6/42* | (2006.01) | |
| *G02B 6/00* | (2006.01) | |

(52) U.S. Cl.
CPC ............ *G02B 6/125* (2013.01); *G02B 6/2938* (2013.01); *G02B 6/29388* (2013.01); *G02B 6/42* (2013.01); *G02B 26/101* (2013.01); *G03B 21/2033* (2013.01); *H04N 9/3129* (2013.01); *H04N 9/3161* (2013.01); *G02B 6/00* (2013.01)

(56) References Cited

U.S. PATENT DOCUMENTS

| | | | |
|---|---|---|---|
| 6,556,735 B1 | 4/2003 | Kato | |
| 9,240,671 B2 | 1/2016 | Ide | |
| 9,952,389 B2 * | 4/2018 | Katsuyama | ............... G02B 6/42 |
| 10,185,091 B2 * | 1/2019 | Katsuyama | ............... G02B 6/42 |
| 2008/0002933 A1 * | 1/2008 | Singh | ................. G02B 6/12007 |
| | | | 385/24 |
| 2011/0122481 A1 | 5/2011 | Ide et al. | |
| 2011/0274125 A1 | 11/2011 | Kitabayashi | |
| 2012/0039565 A1 * | 2/2012 | Klein | ................. G02B 6/12007 |
| | | | 385/14 |
| 2012/0068609 A1 | 3/2012 | Ide et al. | |
| 2015/0236472 A1 | 8/2015 | Ide et al. | |

FOREIGN PATENT DOCUMENTS

| | | | |
|---|---|---|---|
| CN | 103116202 A | | 5/2013 |
| JP | 61-284708 A | | 12/1986 |
| JP | 61284708 A | * | 12/1986 |
| JP | 10-246827 A | | 9/1988 |
| JP | 2-62521 A | | 3/1990 |
| JP | 9-512353 A | | 12/1997 |
| JP | 10-332966 A | | 12/1998 |
| JP | 11-30722 A | | 2/1999 |
| JP | 11-191656 A | | 7/1999 |
| JP | 11-211924 A | | 8/1999 |
| JP | 2000-019345 A | | 1/2000 |
| JP | 2009-244812 A | | 10/2009 |
| JP | 2010-134224 A | | 6/2010 |
| JP | 2013-195603 A | | 9/2013 |
| WO | 2010/137661 A1 | | 12/2010 |
| WO | 2016-061826 A1 | | 4/2016 |

OTHER PUBLICATIONS

Non Final Office Action dated Jul. 27, 2017, issued in U.S. Appl. No. 15/309,594.
Office Action dated Sep. 12, 2018, issued in counterpart Chinese application No. 201580024168.9, with English translation. (16 pages).
Office Action dated Dec. 4, 2018, issued in counterpart Japanese Application No. 2016-517831, with English translation (7 pages).
Office Action dated Jul. 16, 2019, issued in counterpart JP Application No. 2016-517831, with English translation (9 pages).
Office Action dated Apr. 30, 2019, issued in counterpart CN Application No. 201580024168.9, with English translation (13 pages).

* cited by examiner

PRIOR ART

MULTIPLEXER

CROSS-REFERENCE TO RELATED APPLICATION

This application is a continuation-in-part of U.S. application Ser. No. 15/866,743, filed on Jan. 10, 2018, whereas U.S. application Ser. No. 15/866,743 is a Divisional of U.S. application Ser. No. 15/309,594, filed on Nov. 8, 2016, and wherein U.S. application Ser. No. 15/309,594 is a national stage application filed under 35 U.S.C. § 371 of International Application No. PCT/JP2015/056560, filed on Mar. 5, 2015, which is based upon and claims the benefit of priority of the prior Japanese Patent Application No. 2014-097561, filed on May 9, 2014, the entire contents of which are incorporated herein by reference.

TECHNICAL FIELD

The present invention relates to a multiplexer which multiplexes a plurality of visible light rays having different wavelengths as well as an image projection apparatus and an image projection system using the multiplexer.

BACKGROUND ART

Optical coupling devices using a Mach-Zehnder interferometer (hereinafter referred to as MZI) have been known (see Patent Literature 1). Displays can be expected to be more compact by using such optical coupling devices.

Patent Literature 1 discloses a technology for multiplexing or demultiplexing two visible light rays having different wavelengths through the use of a phase difference due to the difference in the optical path length in an MZI optical waveguide into which the two visible light rays enter. However, the technology in Patent Literature 1 can multiplex only two light rays having different wavelengths, and therefore cannot be applied to image forming apparatuses that need to multiplex at least three visible light rays of R, G and B.

Therefore, as shown in Patent Literature 2, the present applicant has proposed a multiplexer and an image projection apparatus that make it possible to project an image in the image projection apparatus by multiplexing three visible light rays of R, G and B, which are the three primary colors of light.

FIGS. 10A and 10B are diagrams illustrating the multiplexer that has been disclosed by the present applicant in Patent Literature 2. FIG. 10A is a plan diagram, and FIG. 10B is a side diagram showing the multiplexer, where the incident ports of the waveguides are exposed.

A multiplexer 10' is provided with a substrate 210 formed of silicon (Si), a BOX layer 215 formed of silicon dioxide ($SiO_2$) on the substrate 210, a cover layer 220 formed of $SiO_2$ on the BOX layer 215, and a first waveguide 101', a second waveguide 102' and a third waveguide 103' that are formed in the cover layer 220 and placed within a plane parallel to the upper surface of the BOX layer 215.

Here, the substrate 210, the BOX layer 215 and the cover layer 220 form the main body 100 of the multiplexer 10'.

A red light ray (R) having a wavelength $\lambda R$ of 620 to 750 nm, a green light ray (G) having a wavelength $\lambda G$ of 495 to 570 nm, and a blue light ray (B) having a wavelength $\lambda B$ of 450 to 495 nm, which are in a single mode having different wavelengths, enter into the first waveguide 101', the second waveguide 102' and the third waveguide 103' through the incident ports 101a', 102a' and 103a' that are exposed from one end face of the BOX layer 215 and the cover layer 220. The RGB light rays respectively propagating through the first waveguide 101', the second waveguide 102' and the third waveguide 103' are multiplexed and emitted from the other end 102b' of the second waveguide 102' that is exposed from the other end face of the clad layer 220.

The first waveguide 101', the second waveguide 102' and the third waveguide 103' are placed at intervals that can prevent stray light from being generated. A first multiplexing unit 110, a second multiplexing unit 120 and a third multiplexing unit 130 are provided along the path of the second waveguide 102' through which visible light propagates starting from the incident port 102a' side. The first multiplexing unit 110, the second multiplexing unit 120 and the third multiplexing unit 130 are formed as directional couplers in such a manner that the third waveguide 103 makes contact with the second waveguide 102' in the first multiplexing unit 110 and in the third multiplexing unit 130, and the first waveguide 101' makes contact with the second waveguide 102' in the second multiplexing unit 120 so that the visible light rays R, G and B can be multiplexed.

CITATION LIST

Patent Literature

Patent Literature 1: Japanese Laid-open Patent Publication No. 2010-134224
Patent Literature 2: Japanese Laid-open Patent Publication No. 2013-195603

SUMMARY OF INVENTION

Problems to be Solved by the Invention

In the above-described optical waveguide multiplexer, the incident ports 101a', 102a' and 103a' are irradiated with laser beams through optical fibers or directly from semiconductor laser chips 16a, 16b and 16c that are attached to one end of the main body 100 as illustrated in the figure.

As illustrated in FIG. 11, however, the laser beams that are emitted from optical fibers or the semiconductor laser chips 16a, 16b and 16c have a spread angle $\theta 1$ with an optical axis X, along which the laser beam normally proceeds from the emitting surface, at the center, and therefore, such a problem arises that the first multiplexing unit 110 is irradiated with part of the laser beams that have leaked from the waveguides 101', 102' and 103', and thus, visible light rays other than the visible light rays that were originally targeted to be multiplexed mix into the first multiplexing unit 110 (hereinafter referred to as stray light).

In order to suppress the generation of such a mixture, waveguides 101', 102' and 103' may be provided at sufficient intervals s (see FIG. 10) so that the optical fibers and the semiconductor laser chips 16a, 16b and 16c can be sufficiently spaced from each other. However, such a problem arises that the greater the intervals s between the waveguides 101', 102' and 103' are, the larger the multiplexer 10' is scaled.

In addition, the waveguides 101', 102' and 103' are arranged next to each other so as to be parallel to each other as illustrated in FIG. 10. When the waveguides 101', 102' and 103' are close to each other with the intervals being a certain distance or less, however, light that has oozes as an evanescent wave moves over to another waveguide that is in proximity, which allows the visible light rays that were originally targeted to propagate to be mixed with another visible light ray so as to cause stray light. The intervals s between the waveguides 101', 102' and 103' that can prevent such stray light from being generated are approximately 30 µm or greater, and therefore, it is theoretically possible to make the waveguides 101', 102' and 103' close to each other with intervals s being approximately 30 µm.

Incidentally, semiconductor laser chips 16a, 16b and 16c of which the size is as minimal as approximately 500 µm in width, approximately 100 µm in thickness, and approximately 500 µm in length have become available in the market in recent years. Even in the case where the semiconductor laser chips 16a, 16b and 16c are arranged adjacent to one another when being arranged at one end of the main body 100, however, the intervals s between the waveguides 101', 102' and 103' need to be 500 µm at minimum, and intervals are required between the semiconductor laser chips 16a, 16b and 16c in order to suppress the effects due to heat emission. Because of these reasons, such a problem arises that there is a limit to which the width of the multiplexer 10' can be reduced.

Furthermore, it is necessary for the radius of curvature of the curved portions R of the waveguides 101', 102' and 103' (see FIG. 10) to be sufficiently large, or it is necessary for the length of the arc of the curved portions R to be sufficiently long in order to widen the intervals s between the waveguides 101', 102' and 103' from the first multiplexing unit 110 where the waveguides 101', 102' and 103' are in such proximity as to almost make contact with each other. Moreover, the laser beams have a certain spread angle, and therefore, the first multiplexing unit 110 is irradiated with part of the spread laser beams, which causes stray light in the case where the semiconductor laser chips 16a, 16b and 16c are arranged side by side as described above. Because of these problems, there is also a limit to which the length of the multiplexer 10' can be reduced.

The present invention is provided in view of the above-described problems, and an object of the invention is to provide a multiplexer in which the effects on the multiplexing units of the spreading of the laser beams from the laser beam sources such as the optical fibers or semiconductor laser chips can be suppressed, and the width and the length of the multiplexer can be greatly reduced as long as stray light is not generated. Another object of the invention is to provide an image projection apparatus using the multiplexer and an image projection system.

Means for Solving the Problems

A multiplexer that can wavelength multiplex a plurality of visible light rays having different wavelengths, comprising: a plurality of waveguides into which the visible light rays enter; multiplexing units that are provided in the middle of a waveguide and can mode couple the visible light rays that propagate through at least two waveguides; and laser beam sources for irradiating the waveguides with the visible light rays, the multiplexer being characterized in that the multiplexing unit placed the closest to the laser beam sources is a first multiplexing unit, and a laser beam source of which the optical axis is located at a distance away from the axis along which the visible light ray that is led into the first multiplexing unit propagates is arranged in such a manner that the optical axis is inclined relative to the axis along which the visible light ray that is led into the first multiplexing unit propagates so that the outer periphery of the laser beam that spreads at a predetermined spread angle passes in front of the first multiplexing unit.

In the multiplexer according to the present invention, three visible light rays such as of three primary colors (red (R), green (G) and blue (B)) can be used. By doing this, it becomes possible to apply the multiplexer according to the present invention to an image projection apparatus. That is to say, the multiplexer can be provided with: a first waveguide into which a first visible light ray enters; a second waveguide into which a second visible light ray of which the wavelength is shorter than that of the first visible light ray enters; a third waveguide into which a third visible light ray of which the wavelength is shorter than that of the second visible light ray enters, where the difference in the wavelength between the second visible light ray and the third visible light ray is smaller than that between the first visible light ray and the second visible light ray; a first multiplexing unit and a third multiplexing unit that mode couple visible light rays between the second waveguide and the third waveguide; and a second multiplexing unit that mode couples visible light rays between the first waveguide and the second waveguide, where the first multiplexing unit, the second multiplexing unit and the third multiplexing unit are arranged in this order starting from the laser beam sources side, and the multiplexer can have such a configuration where the laser beam sources for the first waveguide and the third waveguide are arranged in such a manner that the optical axis of each laser beam source is inclined relative to the axis along which a visible light ray that is led into the first multiplexing unit propagates so that the outer periphery of the laser beam that spreads at a predetermined spread angle passes in front of the first multiplexing unit.

Thus, the optical axis of a predetermined laser beam source is inclined relative to the axis along which a visible light ray that is led into the first multiplexing unit propagates so that stray light can be suppressed from being generated by irradiating the first multiplexing unit with part of a laser beam.

The angle of inclination can be found by the distance between the incident port of the waveguide and the incident portion of the first multiplexing unit, the intervals between the waveguides, and the angle at which the laser beam spreads from the laser beam source. When a laser beam source is inclined, the laser beam crosses another waveguide with a risk of the stray light affecting the waveguide. Even in such a case, the effects of stray light on the waveguide can be suppressed to the minimum by adjusting the angle of inclination θ in a range of 0°<θ≤90°. In addition, the size of the multiplexer can be made minimum by adjusting the angle of inclination θ to a right angle.

A bending unit that can change the direction of the visible light ray that propagates along a waveguide in such a manner that the optical path of the visible light is bent may be provided between the first multiplexing unit and another laser beam source. The bending unit may be able to bend the direction in which a visible light ray propagates through a waveguide at an angle, which is formed when two lines intersect. Examples can be cited such as a diffraction grating formed in a part of a waveguide, a mirror (waveguide type reflector) formed by creating a trench in the direction towards the core of the waveguide, and a mirror provided by vapor depositing aluminum on the outside of the core of a waveguide.

The use of such a bending unit makes it possible to provide a laser beam source at one end and on the sides of the main body of the multiplexer, and thus makes it possible to greatly reduce the width and the length of the multiplexer. In addition, the use of such a bending unit increases the degree of freedom in the arrangement of the laser beam sources such as semiconductor laser chips, and therefore also increases the degree of freedom in designing an image projection apparatus or the like that utilizes the multiplexer according to the present invention.

A light converging means may be provided at an incident port for a laser beam from a laser beam source in a waveguide. For example, an end portion of the waveguide may be tapered, or a lens may be provided between the laser beam source and the waveguide.

Though the angle at which the bending unit bends the optical path is not particularly limited, it is preferable for the angle to be within a range from 80° to 100° in the case where a waveguide type reflector is used, for example. It is more preferable for the angle to be a right angle.

An image projection apparatus using the multiplexer according to the present invention uses a multiplexer having the above-described structure that is provided with: a horizontal scanning unit and a vertical scanning unit that can two-dimensionally scan an object with the wavelength multiplexed light emitted from the multiplexer so as to form an image; and an image forming unit that projects the resulting image from the scanning with the wavelength multiplexed light onto a surface on which an image is to be projected. In such a case, the multiplexer may be provided with the horizontal scanning unit and the vertical scanning unit. By doing this, the image projection apparatus can be made compact.

In addition, an image projection system having an image projection apparatus as described above can be formed of: a transmission and receiving apparatus for transmitting and receiving image data; a peripheral apparatus that includes an image taking apparatus such as a camera or a terminal apparatus such as a mobile phone or a PC; and a control apparatus for controlling the transmission and receiving apparatus, the peripheral apparatus and the image projection apparatus.

The image projection apparatus according to the present invention, where a multiplexer having the above-described structure is used, as well as an image projection system provided with such an image projection apparatus make it possible to make the apparatus and the system compact due to the multiplexer that has been made compact, and in addition can increase the freedom in designing the apparatus and the system due to a high level of freedom in the arrangement of the light sources such as semiconductor laser chips provided in the multiplexer.

BRIEF DESCRIPTION OF DRAWINGS

FIG. 10A is a plan diagram, and FIG. 10B is a front diagram illustrating the multiplexer as viewed from one end side where the incident ports of the waveguides are exposed.

DESCRIPTION OF EMBODIMENTS

In the following, the preferred embodiments of the present invention are described in detail in reference to the drawings.

Figure 1:
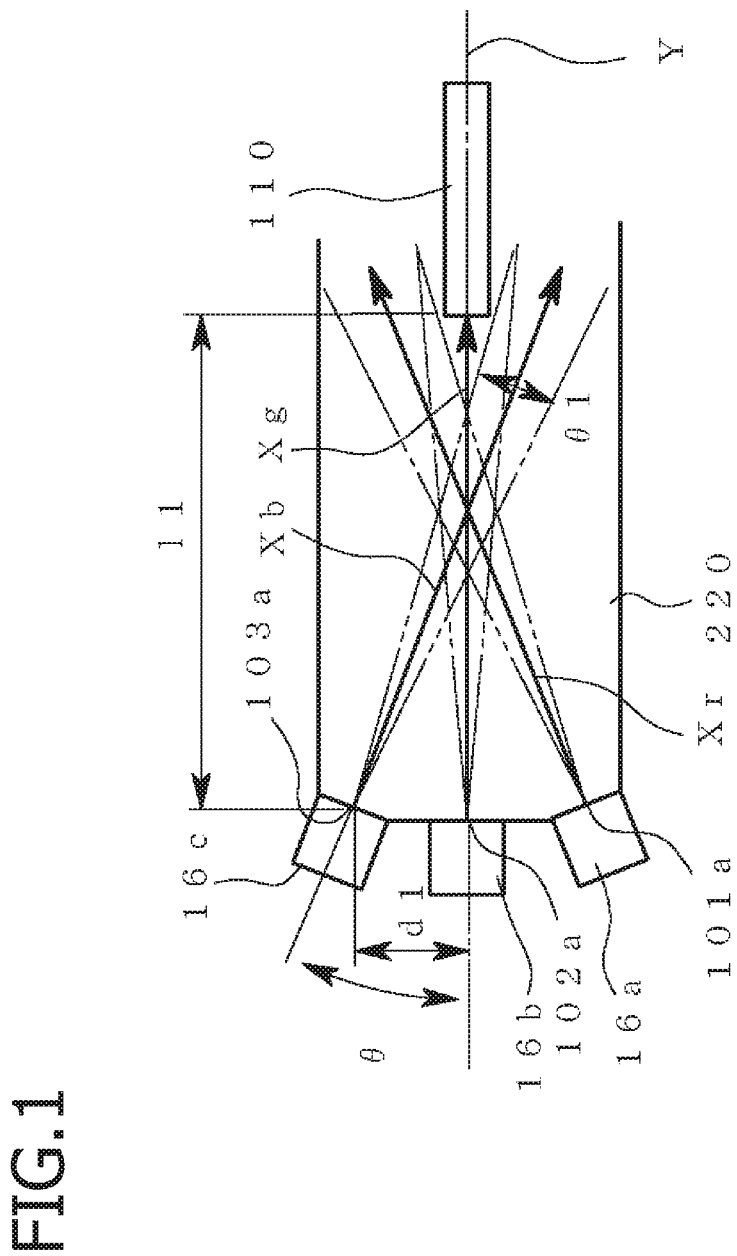
FIG. 1 is a diagram illustrating the basic concept of the present invention and the arrangement of the laser beam sources for three visible light rays.
Figure 2A:
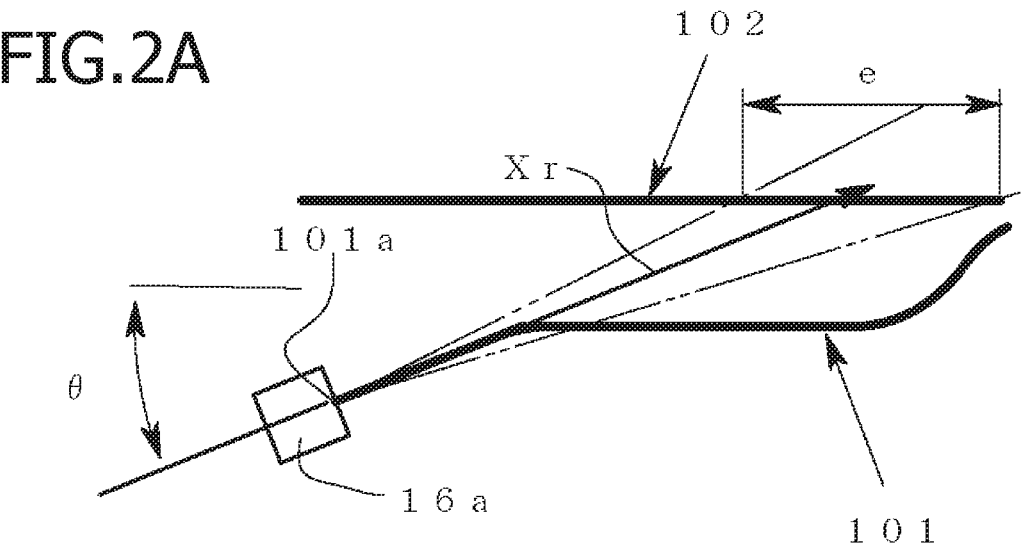
FIG. 2A is a diagram illustrating the relationship between a laser light source and a waveguide in the case of the arrangement in FIG. 1.
Figure 2B:
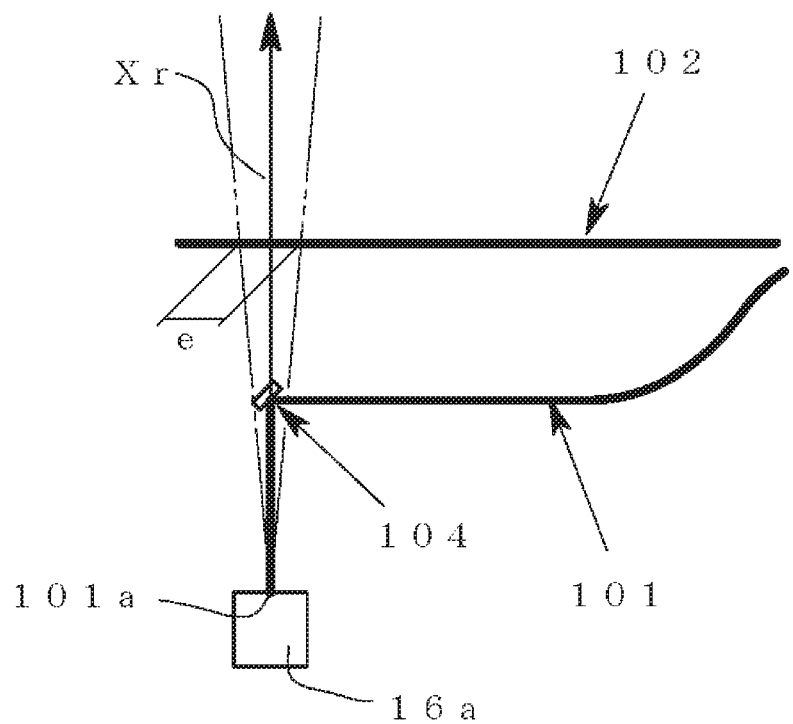
FIG. 2B is a diagram illustrating another case where a bending unit for bending the optical path to a right angle is provided in the middle of a waveguide.
Figure 3:
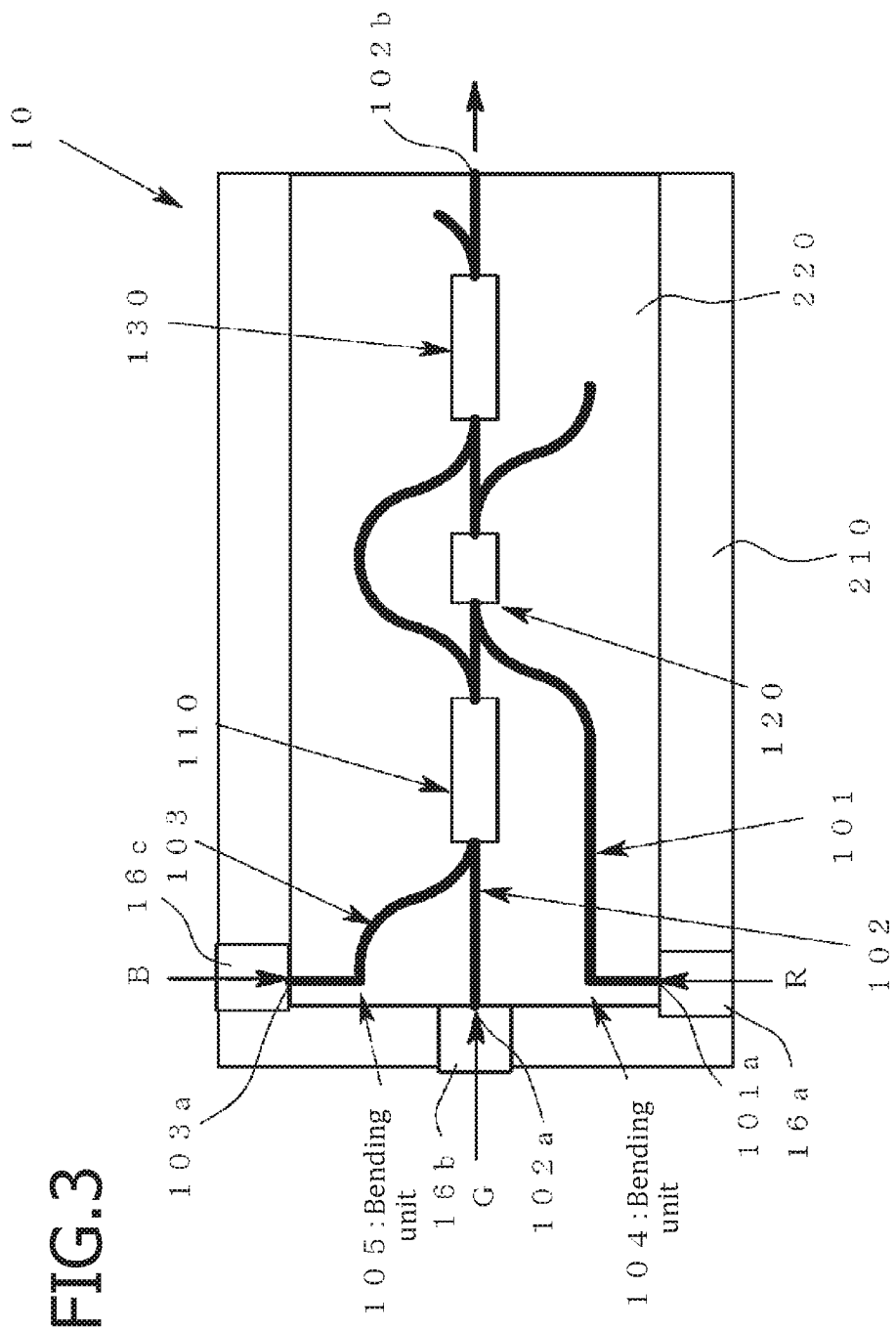
FIG. 3 is a schematic plan diagram illustrating the multiplexer having a bending unit for bending the optical path to a right angle according to one embodiment.
Figure 4A:
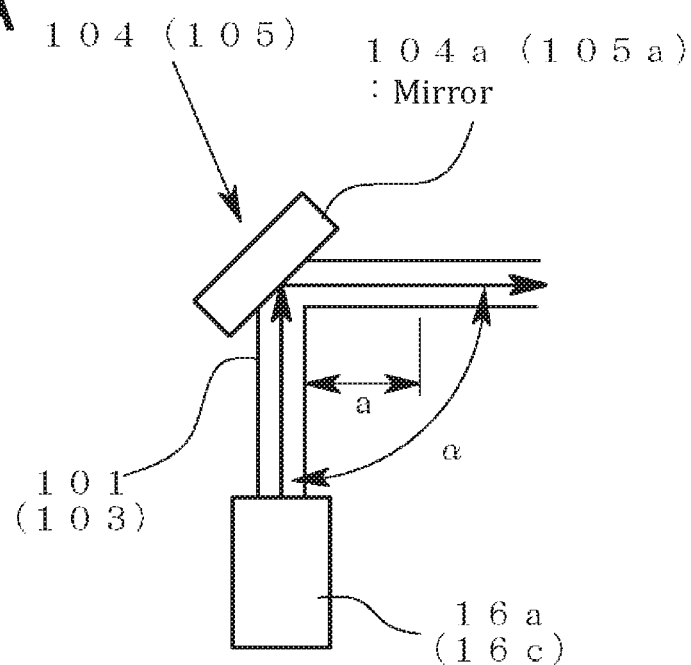
FIGS. 4A and 4B are diagrams illustrating an enlarged portion of the structure of a bending unit in a waveguide.
Figure 4B:
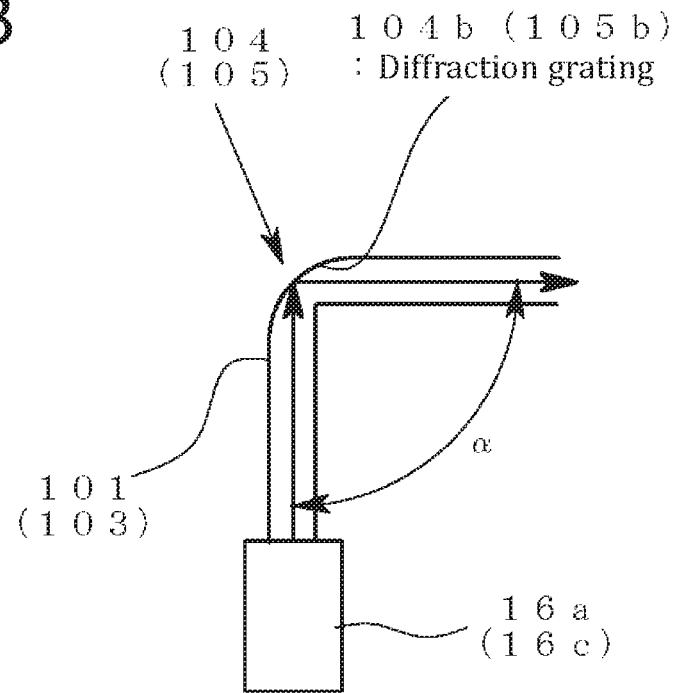
Figure 5A:
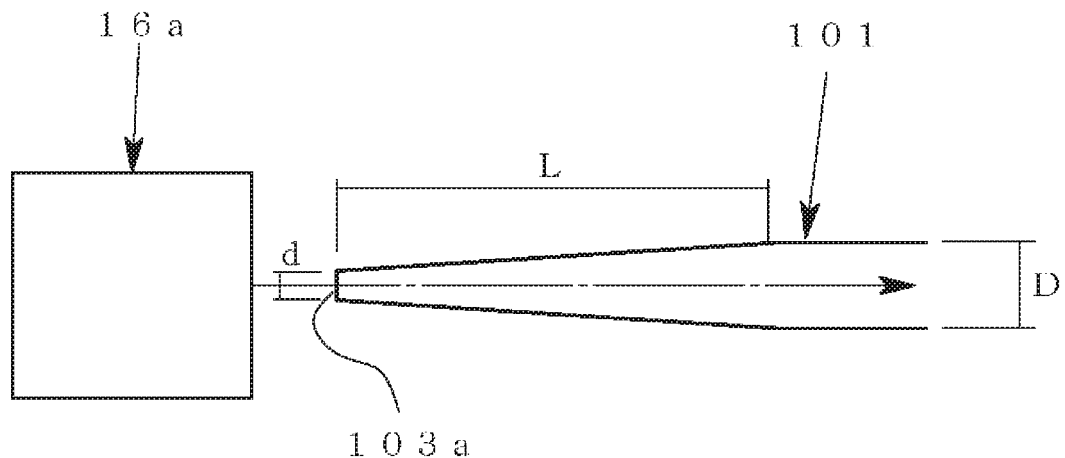
FIGS. 5A and 5B are diagrams illustrating an enlarged portion at an end of a waveguide provided with a light converging means.
Figure 5B:
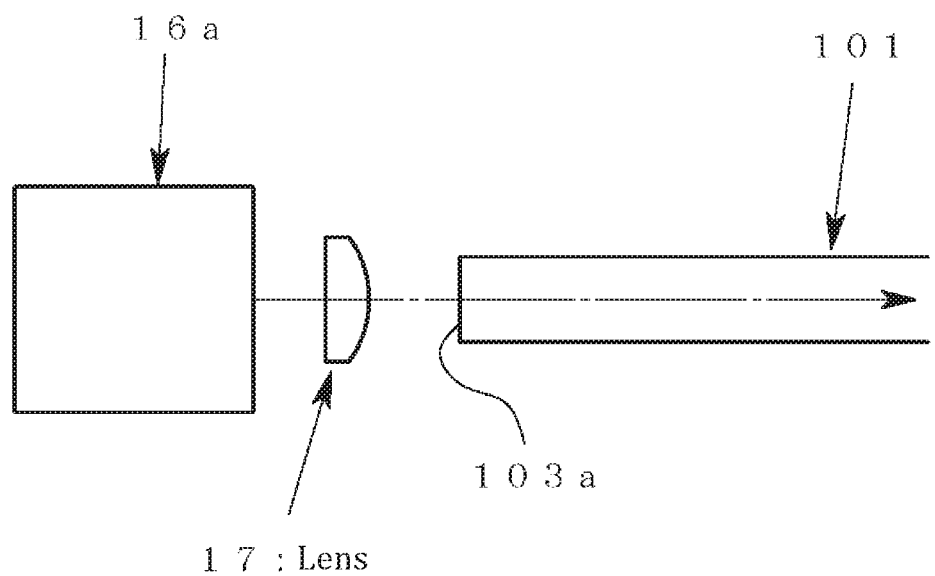

FIG. 1 is a diagram illustrating the basic concept of the present invention and illustrates the arrangement of laser beam sources in a case where three visible light rays are used. FIG. 2A is a diagram illustrating the relationship between a laser beam source and a waveguide in the case of the arrangement in FIG. 1, and FIG. 2B is a diagram illustrating another example in a case where a bent portion that bends at right angles is provided in the middle of a waveguide. FIG. 3 is a schematic plan diagram illustrating the multiplexer having bent portions that bend at right angles according to one embodiment. FIGS. 4A and 4B are diagrams illustrating an enlarged portion of the structure of a bent portion. FIGS. 5A and 5B are diagrams illustrating an enlarged portion at an end of a waveguide provided with a light converging means.

[Visible Light Rays that Can be Used]

The below-described three visible light rays that are multiplexed by the multiplexer according to the present invention are monochromatic rays under such conditions that the wavelength of the first visible light ray is the longest, followed by the wavelength of the second visible light ray with the wavelength of the third visible light ray being the shortest, and the difference in the wavelength between the second visible light ray and the third visible light ray is smaller than that between the first visible light ray and the second visible light ray.

A red light ray (R) having a wavelength $\lambda R=620$ to 750 nm, a green light ray (G) having a wavelength $\lambda G=495$ to 570 nm, and a blue light ray (B) having a wavelength $\lambda B=450$ to 495 nm can be cited as examples of the visible light rays that satisfy the above-described conditions. The relationship of $\lambda B<\lambda G<\lambda R$ is formed between the three wavelengths of R, G and B, and from among the wavelength ranges that satisfy the relationship, a red light ray having a wavelength λR=640 nm, a green light ray having a wavelength λG=520 nm, and a blue light ray having a wavelength λB=455 nm can be selected as an example that satisfies the relationship of λR−λG>λG−λB.

[Arrangement of Laser Beam Sources]

In this embodiment, a semiconductor laser chip 16a for red light and a semiconductor laser chip 16c for blue light from among three semiconductor laser chips 16a, 16b and 16c are arranged in such a manner that the optical axes Xr and Xb of the semiconductor laser chips 16a and 16c cross the Y axis along which light propagates at an angle θ as illustrated in FIG. 1.

Figure 11:
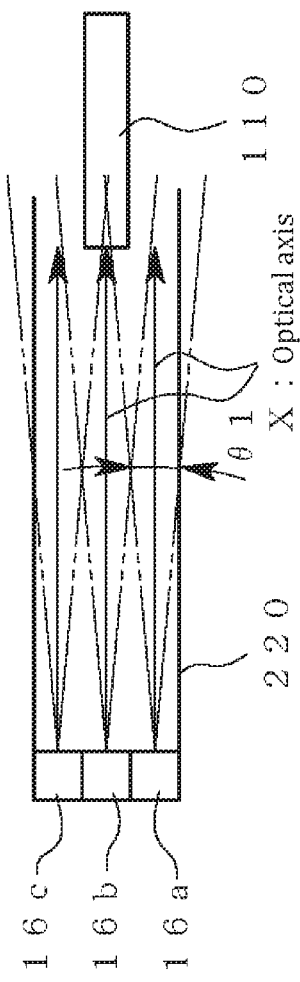
FIG. 11 is a diagram illustrating how the first multiplexing unit is irradiated with laser beams emitted from laser beam sources due to the spreading of the laser beams.

In this embodiment, the two semiconductor laser chips 16a and 16c are arranged in such a manner that the optical axes of these chips incline at an angle θ relative to the Y axis along which light propagates because of the following reasons. That is to say, the semiconductor laser chips 16a and 16c have optical axes Xb and Xr at locations that are at a distance away from the Y axis of the first multiplexing unit 110 along which the visible light rays propagate, where the first multiplexing unit 110 is the closest to the semiconductor laser chips from among the multiplexing units. In the case where the two semiconductor laser chips 16a and 16c are arranged in such a manner that the optical axes Xb and Xr are parallel to the Y axis along which the visible light rays propagate (see FIG. 11), the multiplexing unit 110 is irradiated with the laser beams that spread at an angle θ1, and thus, stray light is generated and affects the multiplexing.

Meanwhile, the semiconductor laser chip 16b for green light that is arranged in the middle has an optical axis Xg at approximately the same location at that of the Y axis along which visible light rays propagate, and therefore, the irradiation of the multiplexing unit 110 with the laser beam that spreads at an angle θ1 hardly allows stray light to affect the first multiplexing unit 110.

As illustrated in this embodiment, in the case where laser beams are led from the three semiconductor laser chips 16a, 16b and 16c to the three waveguides 101, 102 and 103 in order to multiplex visible light rays, the semiconductor laser chips 16a and 16c on the two sides are generally inclined and the semiconductor laser chip 16b in the middle does not need to be inclined.

The angle θ is an angle that prevents the first multiplexing unit 110, which is the multiplexing unit closest to the semiconductor laser chips 16a, 16b and 16c, from being irradiated with the laser beams from the semiconductor laser chips 16a and 16c that spread with the optical axes Xr and Xb at the center.

The angle θ can be found in the following formula when the angle at which the laser beams spread is θ1, the distance between the incident ports 101a and 102a (or between 102a and 103a) is d1, and the distance between the incident port 102a and the incident portion of the first multiplexing unit 110 is l1.

$$\theta > 1/2\theta 1 + \arctan(d1/l1) \qquad \text{[Formula 1]}$$

In the case of the angle at which the laser beams spread being θ1=7°, the distance d1=500 μm, and the distance l1=900 μm, θ=35.5° is found, and therefore, the angle θ can be made greater than 35.5° so that the first multiplexing unit 110 can be prevented from being irradiated with spread laser beams from the semiconductor laser chips 16a and 16c.

Though the angle θ may be an acute angle as illustrated in FIG. 2A, it is preferable for it to be a right angle as illustrated in FIG. 2B. By doing this, the irradiated length e of the waveguide 102 portion that is irradiated with the laser beam from the semiconductor laser chip 16a can be made shortest, which can minimize the effects of stray light on the visible light rays that propagate through the waveguide 102.

In the case where the angle θ is made a right angle, bending units 104 and 105 that reflect visible light rays are provided in the middle of the waveguides 101 and 103 in order to maintain the propagation efficiency of the visible light rays that propagate through the waveguides 101 and 103. The bending units 104 and 105 are bent at right angles, which are formed when two lines intersect orthogonally. In order to allow the visible light rays to propagate efficiently through the portions of the waveguides 101 and 103 that are bent beyond the critical angle, the below-described mirrors 104a and 105a and diffraction gratings 104b and 105b are provided in the bent portions.

[Entire Configuration of Multiplexer]

FIG. 3 illustrates the multiplexer having bending units that are bent at right angles according to one embodiment of the present invention.

Figure 10A:
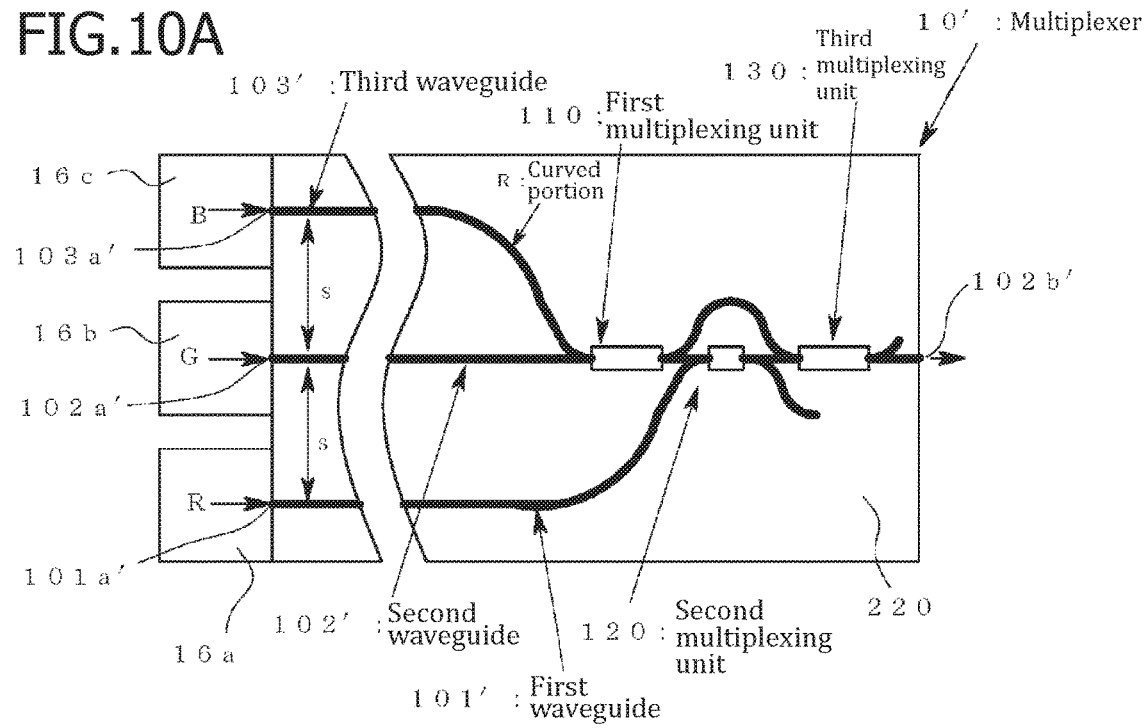
FIGS. 10A and 10B are diagrams illustrating the multiplexer that has been disclosed in Patent Literature 2 by the present applicant, where
Figure 10B:
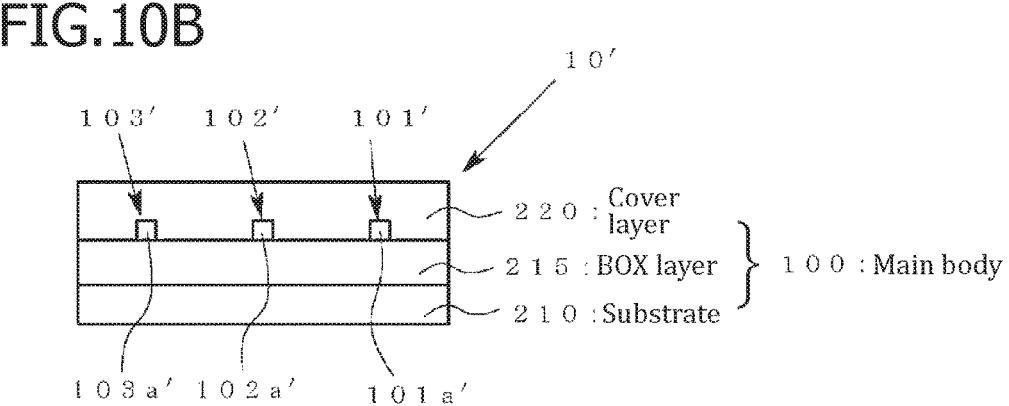

The basic structure of the multiplexer 10 is the same as that of the multiplexer disclosed in Japanese Unexamined Patent Publication 2013-195603 by the present applicant (shown in FIG. 10). The same symbols are attached to the same components as in the multiplexer 10' in FIG. 10, and the detailed descriptions thereof are not repeated.

The multiplexer 10 is different from the multiplexer 10' in FIG. 10 in the point that end portions of the first waveguide 101 and the third waveguide 103 are bent or curved so that the directions in which visible light rays B and R enter into the first waveguide 101 and the third waveguide 103 cross the direction in which the wavelength multiplexed visible light rays are emitted from the second waveguide 102.

Bending units 104 and 105 are provided in end portions of the first waveguide 101 and the third waveguide 103 so that the optical paths of the first visible light ray and the third visible light ray that have entered through the incident ports 101a and 103a can be changed within the first waveguide 101 and the third waveguide 103. Thus, the first waveguide 101 and the third waveguide 103 are bent or curved in these portions where the bending units 104 and 105 are provided.

FIGS. 4A and 4B illustrate an example of the bending unit 104 or 105.

In the example in FIG. 4A, a mirror 104a or 105a that totally reflects visible light is arranged in the bending unit 104 or 105, and the first waveguide 101 or the third waveguide 103 is bent at this portion.

In this embodiment, the mirror 104a or 105a is of a waveguide type where the cover layer 220 is etched from the upper surface so as to create a trench that reaches a portion deeper than the core of the first waveguide 101 or the third waveguide 103, and light is totally reflected from the interface between the air layer of the trench and the glass layer that forms the core.

In such a waveguide type mirror, the ratio of light that enters lowers, and at the same time, the reflectance lowers when the angle α at which the waveguide is bent shifts from the right angle (90°) to an angle that is either greater or smaller. Therefore, the optimal angle α at which the waveguide is bent in such a waveguide type mirror is 90°. However, the allowable angle α at which the waveguide is bent in the case where 50% is the standard ratio of light that enters is within a range from 77° to 100°, and is preferably within a range from 80° to 95°.

In the example illustrated in FIG. 4B, a diffraction grating 104b or 105b is formed in the bending unit 104 or 105.

Thus, the waveguide 101 or 103 is bent at an angle α in the portion where the diffraction grating 104*b* or 105*b* is formed.

In the example in FIG. 4C, the first waveguide 101 or the third waveguide 103 is curved with a curvature radius R. The curved portion 104*c* or 105*c* may be provided with a reflection means such as a mirror or a diffraction grating if necessary.

As other means for changing the optical path in a portion that is bent at a certain angle or curved, those that are publicly-known in Japanese Unexamined Patent Publication 2004-191564 and Japanese Unexamined Patent Publication H10 (1998)-246827 can be used.

[Light Inputting Portion]

In this embodiment, the substrate 210 is formed a little greater than the cover layer 220 and the BOX layer 215 in the length and the width, and semiconductor laser chips 16*a*, 16*b* and 16*c*, which are light sources of visible light rays that enter into the first waveguide 101, the second waveguide 102 and the third waveguide 103, are arranged in a portion (margin) that protrudes from the cover layer 220 and the BOX layer 215.

The semiconductor laser chips 16*a*, 16*b* and 16*c* can be positioned relative to the incident ports 101*a*, 102*a* and 103*a* of the first waveguide 101, the second waveguide 102 and the third waveguide 103 by adjusting the thickness of the substrate 210.

As for the size of the semiconductor laser chips 16*a*, 16*b* and 16*c*, the width is approximately 500 μm, the thickness is approximately 100 μm, and the length is approximately 500 μm, and therefore, the semiconductor laser chips 16*a*, 16*b* and 16*c* can be provided so as to be integrated with the optical multiplexer 10.

In addition, it is preferable for the incident ports 101*a*, 102*a* and 103*a* of the first waveguide 101, the second waveguide 102 and the third waveguide 103 to be provided with a laser beam converging means so that the laser beams from the semiconductor laser chips 16*a*, 16*b* and 16*c* can be led to the waveguides 101, 102 and 103 with high efficiency.

FIGS. 5A and 5B illustrate an example of a laser beam converging means. Though FIGS. 5A and 5B illustrate only a case of the first waveguide 101 as an example, the same laser beam converging means can be applied to cases of the second waveguide 102 and the third waveguide 103.

In the example in FIG. 5A, the first waveguide 101 is formed with one end being tapered. The standard shape of the taper ((D−d)/L) may be approximately $\frac{1}{100}$.

In the example in FIG. 5B, a microscopic lens 17 is arranged between the semiconductor laser chip 16*a* and the incident port 101*a*.

By providing such a laser beam converging means, a visible light ray from a microminiature laser beam source such as the semiconductor laser chips 16*a*, 16*b* and 16*c* can be made to enter into the waveguide 101, 102 or 103 with high efficiency.

[Working Effects]

In the multiplexer 10 having the above-described structure, end portions of the first waveguide 101 and the third waveguide 103 on either side of the second waveguide 102 that runs straight from among the three waveguides 101, 102 and 103 are bent at approximately right angles in the bending units 104 and 105, and thus, it is possible to locate the incident port 101*a* of the first waveguide 101 and the incident port 103*a* of the third waveguide 103 on the sides of the main body 100 of the multiplexer 10 that face each other. In addition, it is possible to arrange the semiconductor laser chip 16*b* that emits a green light ray into the second waveguide 102, from among the semiconductor laser chips 16*a*, 16*b* and 16*c* that are laser beam sources, at one end of the main body 100 of the multiplexer 10, and it is also possible to arrange the semiconductor laser chips 16*a* and 16*c* that emit a red light ray and a blue light ray on either side of the main body 100 of the multiplexer 10.

Therefore, the total length of the main body 100 can be made shorter by the length of the bent portions of the first waveguide 101 and the third waveguide 103. In addition, the entire width of the main body 100 can be made narrower by arranging the semiconductor laser chips 16*a* and 16*c* on the sides of the main body 100, which can narrow the distance s between the first waveguide 101 and the second waveguide 102 as well as between the third waveguide 103 and the second waveguide 102. Thus, the light source integrated type multiplexer 10 having the semiconductor laser chips 16*a*, 16*b* and 16*c* can be made compact. Furthermore, the locations at which the semiconductor laser chips 16*a* and 16*c* are arranged can be changed by appropriately changing the angle α at which the waveguides are bent so that the freedom in designing the multiplexer 10 can be increased.

[Configuration of Scanning Type Display]

Figure 6:
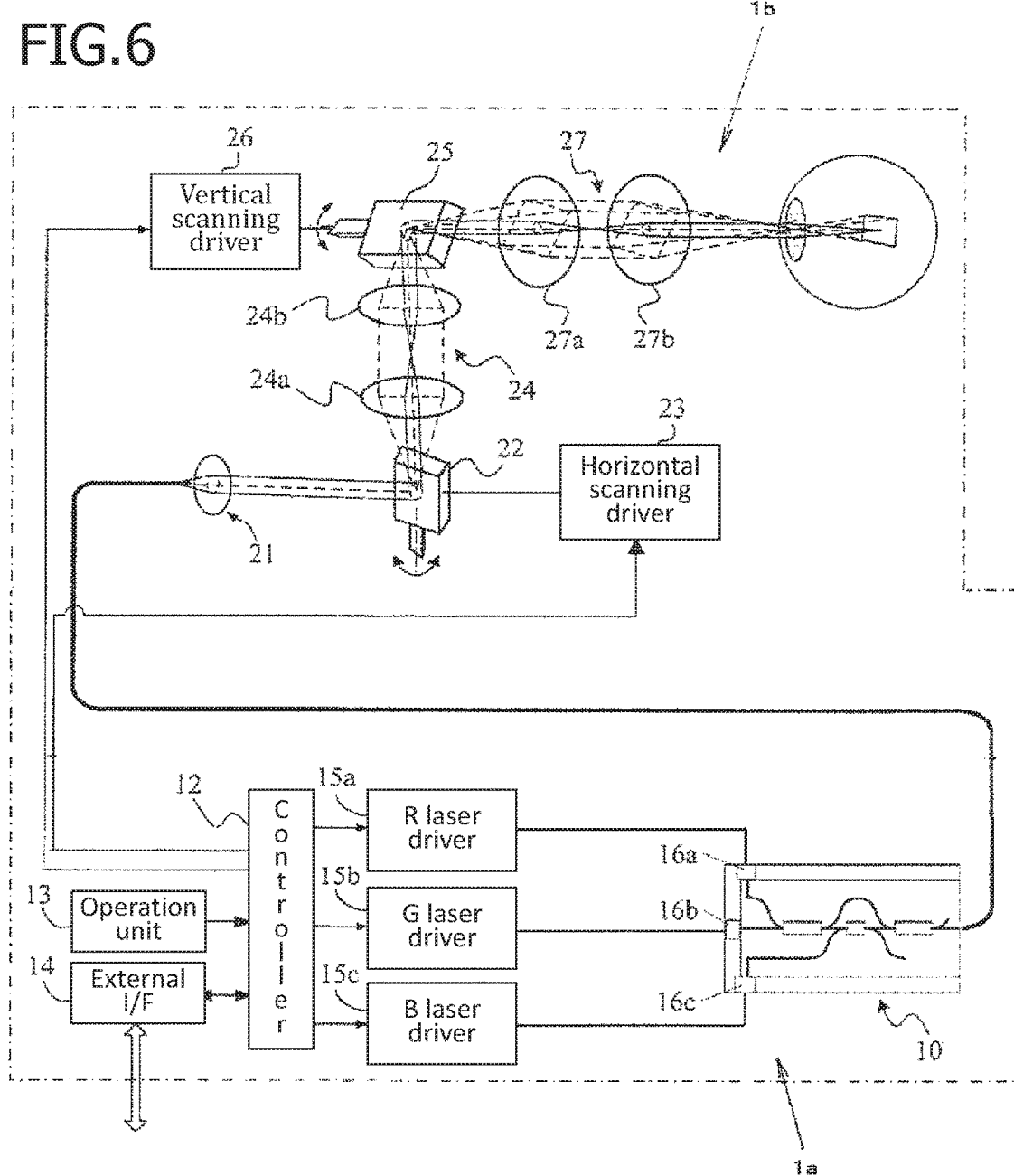
FIG. 6 is a schematic diagram illustrating the configuration of a scanning type display according to one embodiment where the multiplexer 10 according to the present invention is applied to the scanning type display.

FIG. 6 is a schematic diagram illustrating the configuration of a scanning type display in an embodiment where a multiplexer 10 having the above-described structure is applied to the scanning type display.

As illustrated in FIG. 6, a scanning type display 1 has a control unit 1*a* and a display unit 1*b* that are integrally formed.

The display unit 1*b* can be worn on the head of the user together with the control unit 1*a* by using a glass frame type fitting apparatus as disclosed in U.S. Unexamined Patent Publication 2010/0073262.

The control unit 1*a* has a controller 12, an operation unit 13, an external interface (I/F) 14, an R laser driver 15*a*, a G laser driver 15*b*, a B laser driver 15*c* and the multiplexer 10 that is integrally equipped with the semiconductor laser chips 16*a*, 16*b* and 16*c*. The controller 12 is formed of a microcomputer that includes a CPU, a ROM, a RAM and the like. The controller 12 generates an R signal, a G signal, a B signal, a horizontal signal and a vertical signal that become components for synthesizing an image on the basis of the image data that is supplied from the external apparatus such as a PC through the external I/F 14. The controller 12 transmits the R signal to the R laser driver 15*a*, transmits the G signal to the G laser driver 15*b*, and transmits the B signal to the B laser driver 15*c*, respectively.

The controller 12 transmits the horizontal signal to the horizontal scanning driver 23 and transmits the vertical signal to the vertical scanning driver 26, respectively. The horizontal signal and the vertical signal include a sync signal for determining the timing in the operation of a horizontal scanner 22 and a vertical scanner 25, and a drive setting signal for setting the voltage and the frequency of the drive signal that is transmitted to the horizontal scanner 22 and the vertical scanner 25 from the horizontal scanning drive 23 and the vertical scanning drive 26.

The operation unit 13 is formed of various types of buttons that accept the operation by the user and an interface circuit that transmits to the controller 12 an operation signal that is generated when a button is pressed. The various types of buttons that accept the operation by the user are provided on the surface of the housing of the control unit 1*a*, for example. The external I/F 14 is an interface for electrically connecting the control unit 1*a* to an external apparatus such as a PC.

The R laser driver 15*a* drives the semiconductor laser chip 16*a* so that a red laser beam is generated of which the intensity of the light is in response to the R signal from the controller 12. The G laser driver 15b drives the semiconductor laser chip 16b so that a green laser beam is generated of which the intensity of the light is in response to the G signal from the controller 12. The B laser driver 15c drives the semiconductor laser chip 16c so that a blue laser beam is generated of which the intensity of the light is in response to the B signal from the controller 12. It is possible to synthesize a laser beam having a desired color by adjusting the ratio of intensities of the laser beams having the respective colors. The laser beams having the respective colors generated by the semiconductor laser chips 16a, 16b and 16c enter into the waveguides 101, 102 and 103 of the multiplexer 10, respectively, and are multiplexed into a wavelength multiplexed light beam, which is emitted from the multiplexer 10 in this state. The emitted laser beam is conveyed to the display unit 1b through an optical fiber that is included in the signal line.

The display unit 1b has a collimating optical system 21, the horizontal scanner 22, the horizontal scanning driver 23, a relay optical system 24 equipped with lenses 24a and 24b, the vertical scanner 25, the vertical scanning driver 26, and an ocular optical system 27 equipped with lenses 27a and 27b.

The collimating optical system 21 converts the laser beam emitted from the optical fiber to a parallel beam. The laser beam that has been converted to a parallel beam enters into the horizontal scanner 22.

The horizontal scanner 22 operates the laser beam from the collimating optical system 21 in the horizontal direction. Typically, the horizontal scanner 22 has a reflection plane that fluctuates. When the reflection plane fluctuates, the laser beam that is incident on the reflection plane is scanned in the horizontal direction. It is possible to form the horizontal scanner 22 of a resonant type MEMS (microelectromechanical system) mirror that fluctuates using a piezoelectric element. The horizontal scanning driver 23 controls the fluctuations of the horizontal scanner 22 in accordance with the horizontal sync signal from the controller 12. The laser beam scanned horizontally is incident on the relay optical system 24.

The vertical scanner 25 scans the laser beam from the relay optical system 24 in the vertical direction. Typically, the vertical scanner 25 has a reflection plane that fluctuates. When the reflection plane fluctuates, the laser beam that is incident on the reflection plane is scanned in the vertical direction. It is possible to form the vertical scanner 25 of an MEMS mirror that fluctuates, for example. The vertical scanning driver 26 controls the fluctuations of the vertical scanner 25 in accordance with the vertical sync signal from the controller 12. Here, an object has been scanned with the laser beam in the horizontal direction by the horizontal scanner 22, and therefore, the object is two-dimensionally scanned when the object is scanned vertically by the vertical scanner 25 so as to provide an image. The light from the image resulting from the two-dimensional scanning is incident on the ocular optical system 27.

It is possible to provide the horizontal scanner 22 and the vertical scanner 25 so as to be integrated with the multiplexer 10 according to the present invention.

Figure 7:
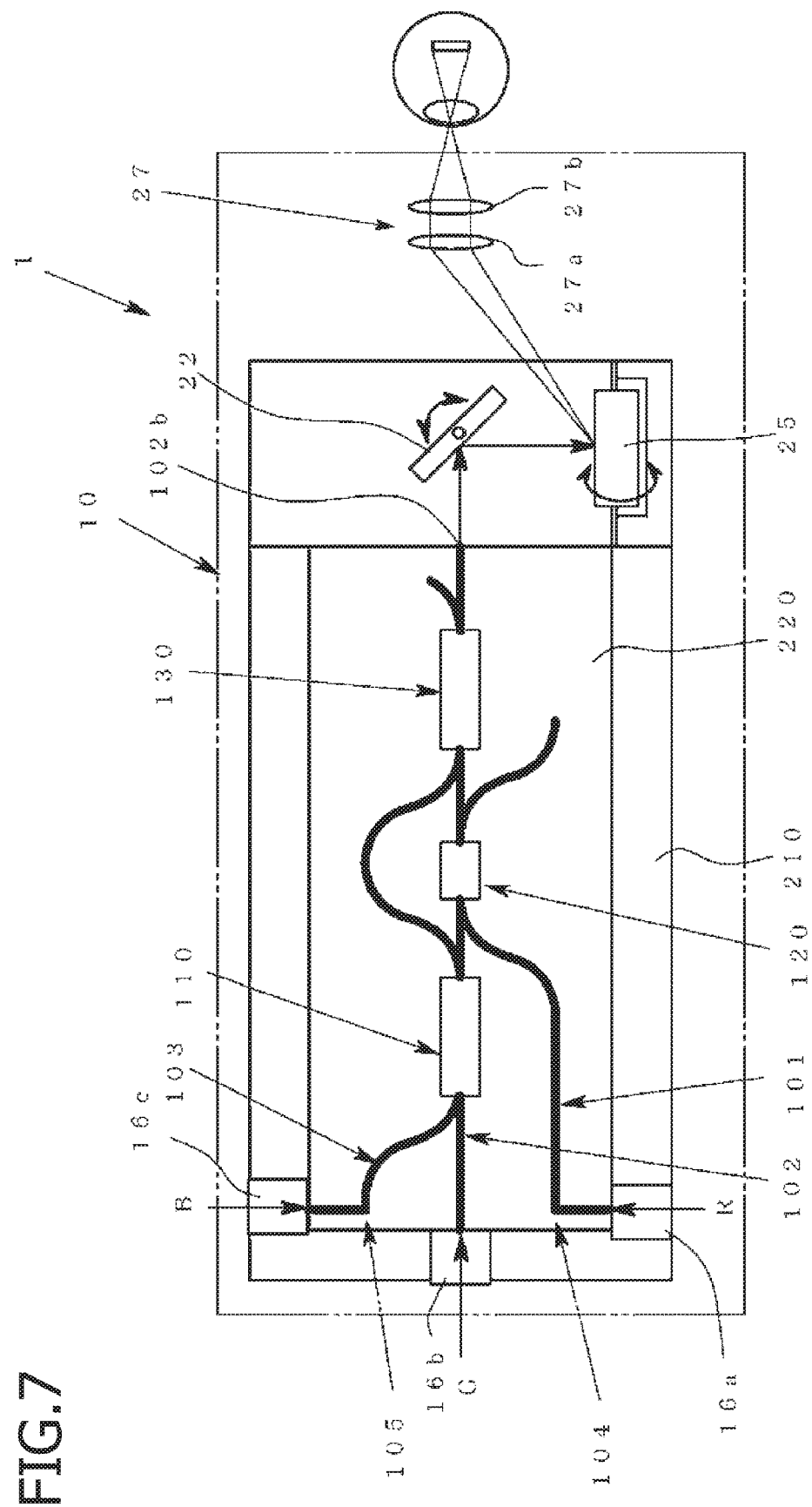
FIG. 7 is a schematic diagram illustrating the multiplexer 10 where a horizontal scanner 22 and a vertical scanner 25 are arranged on the other end 102b side of the second waveguide 102.

FIG. 7 is a schematic diagram illustrating the multiplexer 10 where the horizontal scanner 22 and the vertical scanner 25 are arranged on the other end 102b side of the second waveguide 102.

Thus, the horizontal scanner 22 and the vertical scanner 25 are provided so as to be integrated with the multiplexer 10 so that the relay optical system 24 and the collimating optical system 21 can be made unnecessary. In addition, the horizontal scanning driver 23 and the vertical scanning driver 26 are incorporated into the control apparatus 12 so that the configuration can be simplified by integrating the control unit 1a and the display unit 1b, and the scanning type display 1 can be made compact.

Figure 8:
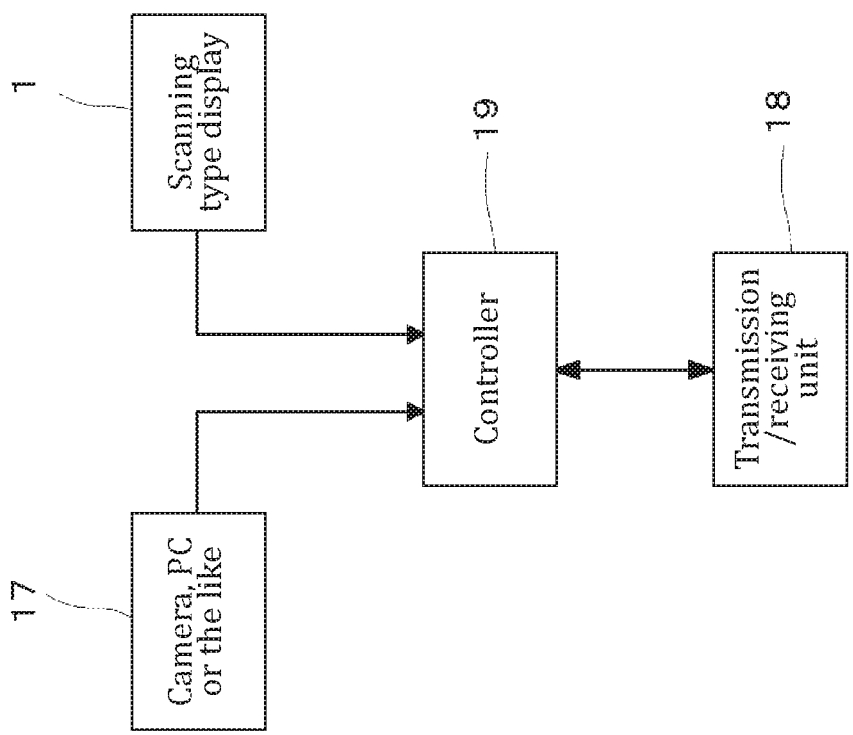
FIG. 8 is a block diagram illustrating the configuration of one example of an image system having a scanning type display.

FIG. 8 is a block diagram illustrating an example of the configuration of an image system that is provided with a scanning type display having the above-described configuration.

A controller 19 receives signals of images taken by a camera 17 and image data stored in a memory of a personal computer or the like and allows the scanning type display 1 to display the corresponding image. In addition, a transmission/receiving unit 18 is connected to the controller 19, which makes possible the connection to an external server or computer, the Internet, a portable phone and the like. Here, it is possible to use the controller 12 of the scanning type display as the controller 19. Thus, the use of the multiplexer 10 according to the present invention makes it possible to make such an image system as compact as a 1 cm square or less.

EXAMPLE 1

Next, a typical example of the multiplexer 10 according to the present invention is described.

In this example, a BOX layer 215 having a thickness of 15 μm is formed through deposition on top of a rectangular substrate 210 formed of $SiO_2$ and having a thickness of 35 μm, a length of 6 mm and a width of 1 mm, and three waveguides 101, 102 and 103 are formed on the upper surface of the BOX layer 215. The waveguides 101, 102 and 103 are made of $SiO_2$ glass doped with $GeO_2$ so as to have a difference of 0.5% in the refractive index with the surrounding clad. The waveguides 101, 102 and 103 have a cross-section of a 2 μm square. In addition, the waveguides 101, 102 and 103 are covered with a cover layer 220 made of $SiO_2$ glass having a thickness of 20 μm.

The BOX layer 215 and the cover layer 220 are slightly smaller than the substrate 210 so as to be provided with margins on one end side and on the left and right sides, where semiconductor laser chips 16a, 16b and 16c having such a size that the width is 500 μm, the thickness is 100 μm, and the length is 500 μm can be mounted on the substrate 210. Here, as the substrate 210, a substrate doped with a high concentration p type dopant having high heat radiating properties (with a resistance value of 1000 Ωcm) is used so that the heat from the semiconductor laser chips 16a, 16b and 16c can be easily released.

Bending units 104 and 105 for changing the direction of the optical path by a right angle (90°) are provided in places that are 300 μm away from the incident ports 101a and 103a of the waveguides 101 and 103. The bending units 104 and 105 have a rectangular trench created from the surface of the cover layer 220 up to a depth of 25 μm so as to have such a size that the width is 10 μm and the length is 5 μm, where the inner wall surfaces of these trenches orthogonally cross the inner wall surface of the core of the waveguides 101 and 103.

The critical angle for the total reflection of light from a wall surface of the above-described trenches is found to be 43.6° when the refractive index of $SiO_2$ based glass is 1.45, and thus, the optical path can be changed by an angle of 87.2°, which is almost a right angle.

The semiconductor laser chips 16a, 16b and 16c are attached to the above-described margins of the substrate 210. As for the size of the substrate 210, the length is 6 mm and the width is 1 mm, while the size of the multiplexer 10 including the semiconductor laser chips 16a, 16b and 16c is such that the length is 7 mm, the width is 2 mm, and the thickness is 500 μm.

In the multiplexer 10 having this size, the first multiplexing unit 110 is slightly affected by stray light due to a visible light ray that spreads at an angle θ1, even in the case where the optical axis Xg of the semiconductor laser chip 16b is almost in the same location as or slightly shifted from the Y axis along which the visible light ray propagates (the amount of shift is approximately +/−30 μm or less), and therefore, the semiconductor laser chip 16b does not need to be inclined.

RGB visible light rays from the semiconductor laser chips 16a, 16b and 16c is incident on the waveguides 101, 102 and 103 in the multiplexer 10 having the above-described configuration. As a result, it was found that the distribution of the optical power in the lateral direction shifted from the stable propagation mode immediately after the visible light rays had been reflected from the wall surface of the trench in such a manner that the direction of the optical path was changed by a right angle. As a result of a simulation, however, it was found that the distribution of the optical power settled in a stable mode when the visible light rays propagated through the waveguides 101 and 103 at a distance that was ten or more times greater than the wavelength.

In addition, it was found that the ratio of the visible light rays that move over from the waveguides 101 and 103 to the waveguide 102 could be made so small as to be negligible when the distance a of the linear portion of the optical path after the direction had been changed in FIG. 4A was ten or more times greater than the wavelength. As a result, it is not necessary to make length of the multiplexing units 110, 120 or 130 longer, which does not make the total length of the multiplexer 10 long when the distance a is ten or more times greater than the wavelength.

Though the preferred embodiments of the present invention are described in the above, the present invention is not limited to these embodiments.

For example, the semiconductor laser chip 16 may be arranged so as to be inclined in such a manner that the optical axis Xg crosses the Y axis along which the visible light rays propagate.

Figure 9A:
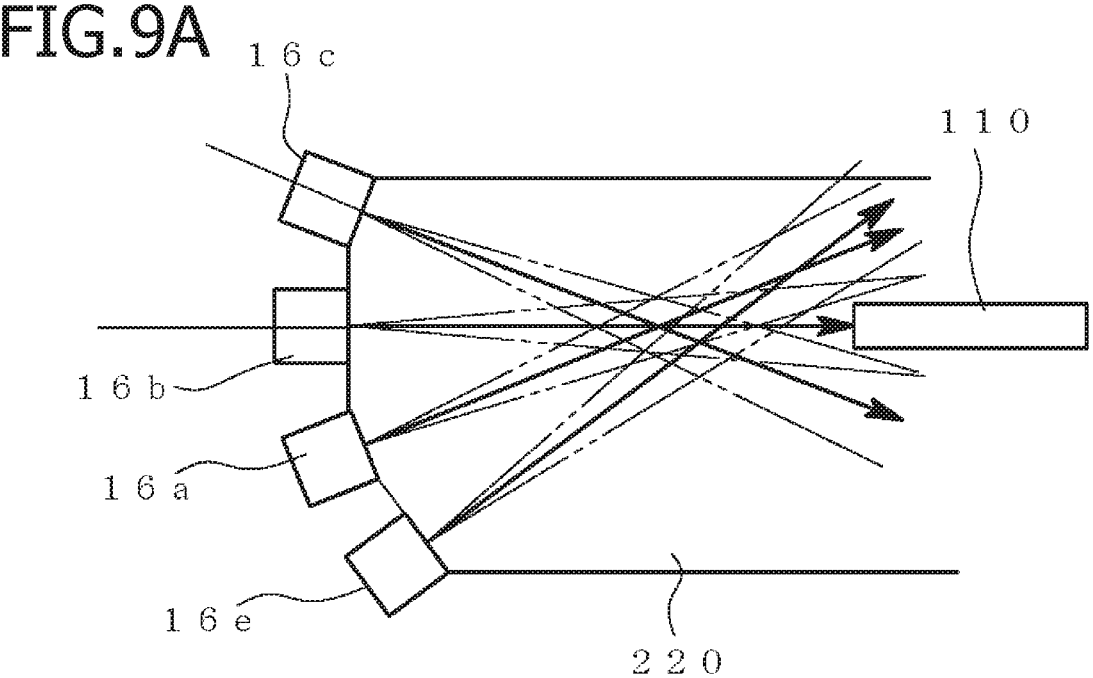
FIGS. 9A and 9B are diagrams illustrating examples of the arrangement of semiconductor laser chips in the case of the multiplexer for multiplexing four or more visible light rays according to another embodiment of the present invention.
Figure 9B:
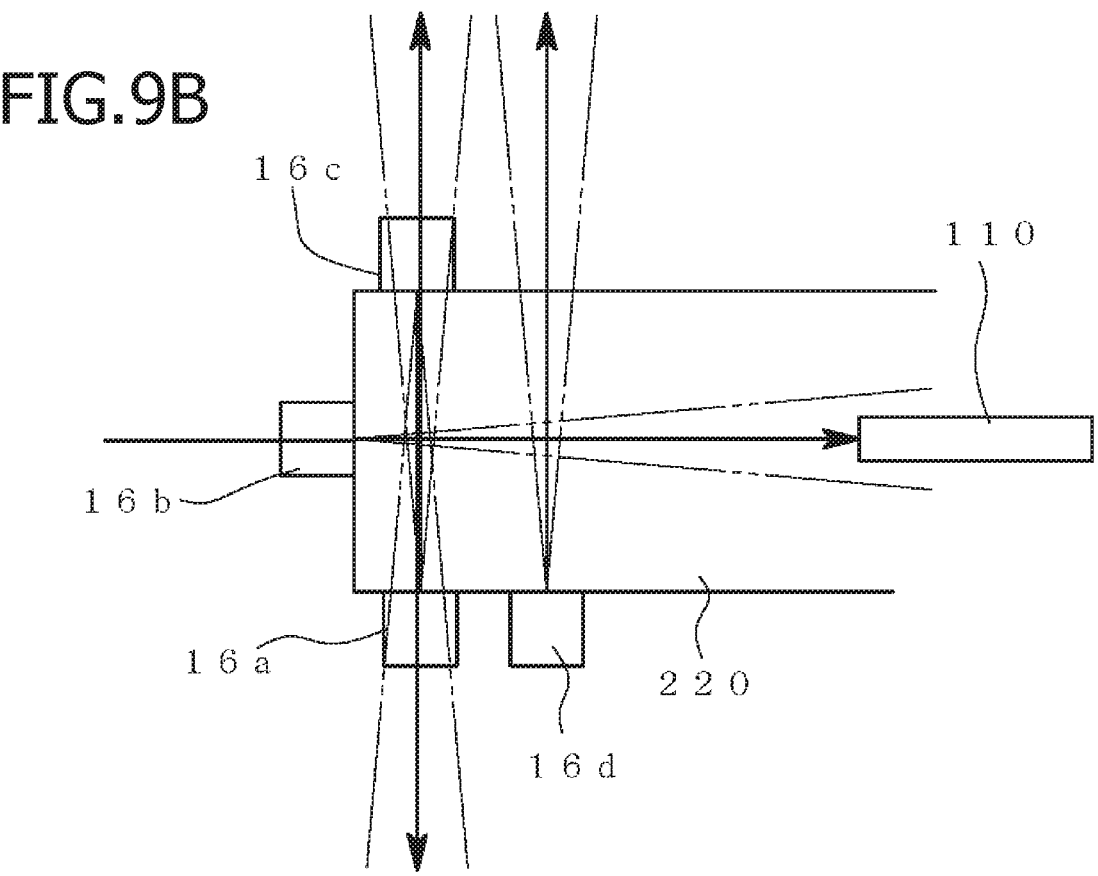

Though RGB light rays are cited as examples of three visible light rays in the description, the application of the multiplexer according to the present invention is possible for three visible light rays other than R, G and B. In addition, the application to a multiplexer for multiplexing four or more visible light rays is possible. In this case, for example, semiconductor laser chips 16 a through 16d may be arranged as illustrated in FIGS. 9A and 9B.

Furthermore, the arrangement of the waveguides 101, 102 and 103 as well as the semiconductor laser chips 16a, 16b and 16c are not limited to a two-dimensional arrangement as in the above. A three-dimensional arrangement is possible in such a manner where, for example, the waveguides 101 and 103 as well as the semiconductor laser chips 16a and 16c are arranged along the circumference with the waveguide 102 at the center.

Though the waveguides 101, 102 and 103 are formed integrally by burying the core layer inside the cover layer 220 in the above description, the waveguides 101, 102 and 103 that are made of a core layer and a dad layer may be formed separately so as to be arranged on a support such as a substrate.

Though waveguide type mirrors are cited as examples in the above embodiments, other types of mirrors may be used, and an example of such mirrors is mirror surfaces formed on the outside of the cores of the first waveguide 101 and the third waveguide 103 through vapor deposition of aluminum.

EXAMPLE 2

Figure 12:
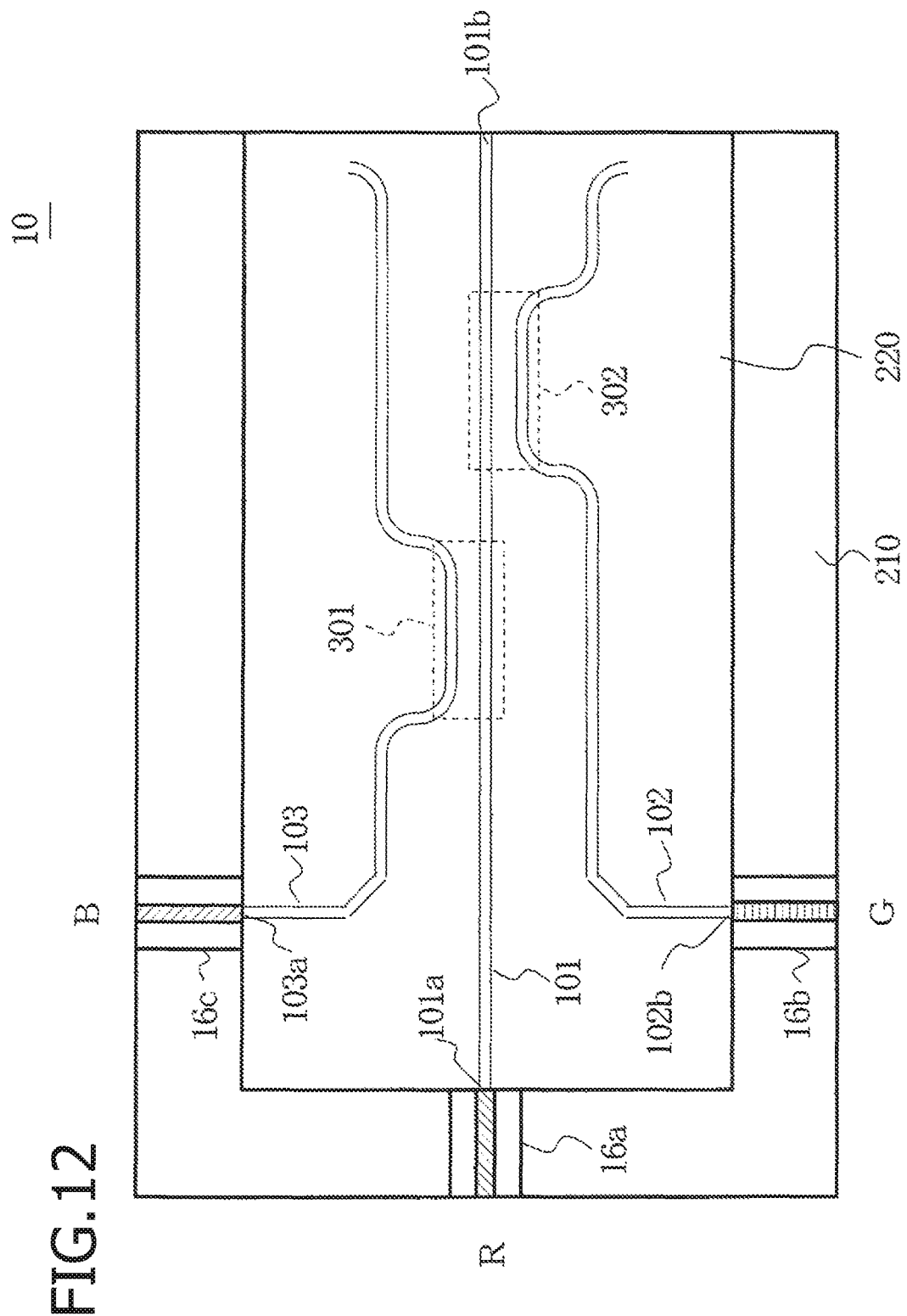
FIG. 12 is a schematic plan diagram illustrating the multiplexer according to Example 2 of the present invention.

Next, the multiplexer according to Example 2 of the present invention is described in reference to FIG. 12. This multiplexer is obtained by modifying the structure of the above-described multiplexing unit in Example 1. FIG. 12 is a schematic plan diagram illustrating the multiplexer according to Example 2 of the present invention. Here, light sources are added in such a manner that a light source module is illustrated in order to make it easy to understand the invention. As illustrated in FIG. 12, a red beam from a semiconductor laser 16a is inputted into a waveguide 101, a green beam from a semiconductor laser chip 16b is inputted into a waveguide 102, and a blue beam from a semiconductor laser 16c is inputted into a waveguide 103. The waveguide 103 directionally couples with the waveguide 101 through a first multiplexing unit 301, and the waveguide 102 directionally couples with the waveguide 101 through a second multiplexing unit 302 so that the output light that has been multiplexed is outputted through the emitting end 101b of the waveguide 101.

The wavelength of the light emitted from the semiconductor laser 16a is 638 nm, the wavelength of the light emitted from the semiconductor laser 16b is 520 nm, and the wavelength of the light emitted from the semiconductor laser 16c is 450 nm.

The length of the first multiplexing unit 301 is 1000 μm, and the length of the second multiplexing unit 302 is 1500 μm.

Here, in the same manner as in the above-described example, the semiconductor laser 16b and the semiconductor laser 16c are arranged so that the outer peripheries of the laser beams from the semiconductor laser 16b and the semiconductor laser 16c pass in front of the first multiplexing unit 301.

EXAMPLE 3

Figure 13:
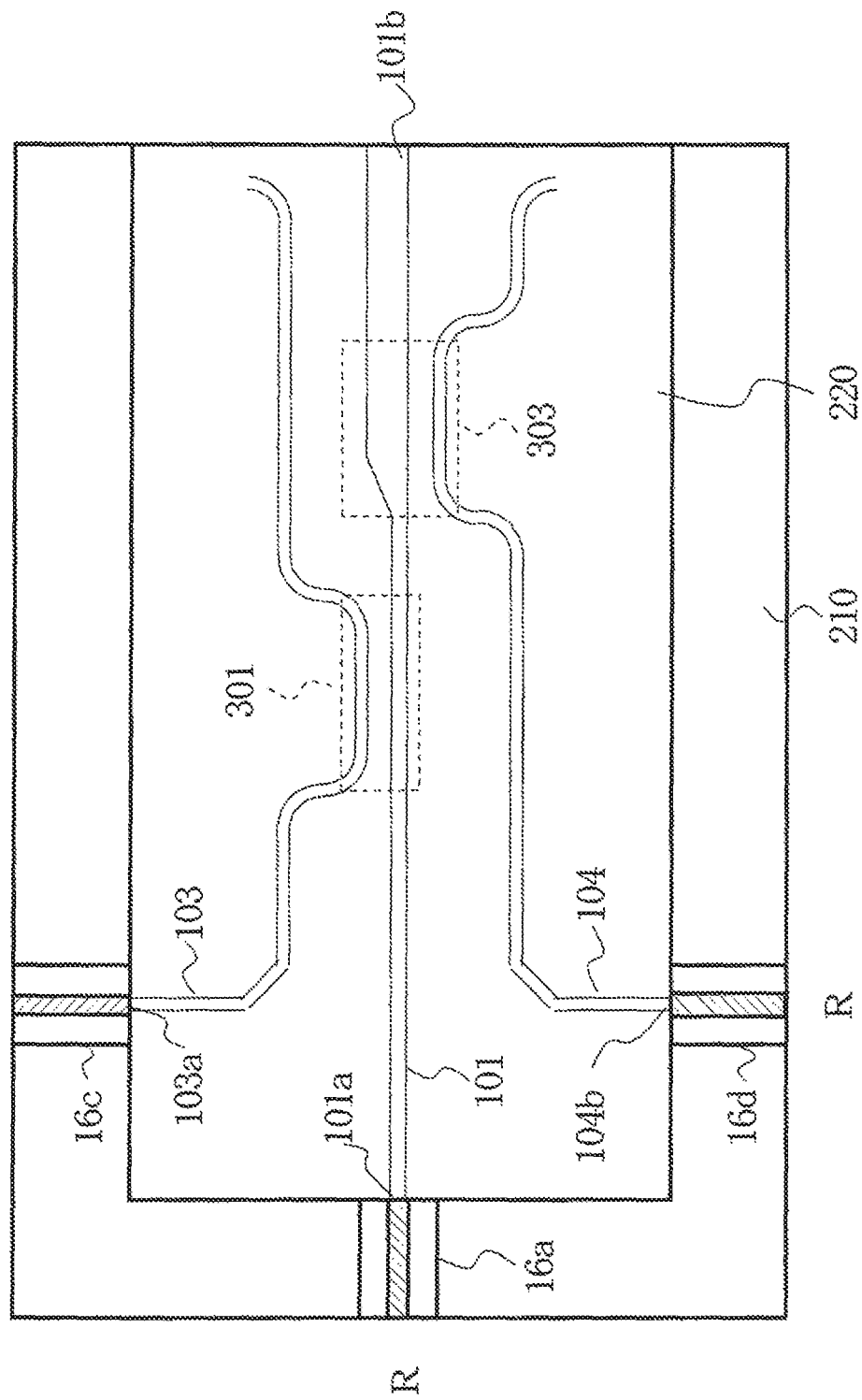
FIG. 13 is a schematic plan diagram illustrating the multiplexer according to Example 3 of the present invention.

Next, the multiplexer according to Example 3 of the present invention is described in reference to FIG. 13. This multiplexer is the same as the above-described multiplexer in Example 2, except the structure of the second multiplexing unit and the fact that at least two light sources emit light having the same wavelength. FIG. 13 is a schematic plan diagram illustrating the multiplexer according to Example 3 of the present invention. Here again, light sources are added in such a manner that a light source module is illustrated in order to make it easy to understand the invention.

As illustrated in FIG. 13, a red beam from a semiconductor laser 16a is inputted into a waveguide 101, a red beam from a semiconductor laser chip 16d is inputted into a waveguide 104, and a blue beam from a semiconductor laser 16c is inputted into a waveguide 103. The waveguide 103 directionally couples with the waveguide 101 through a first multiplexing unit 301, and the waveguide 104 directionally couples with the waveguide 101 through a second multiplexing unit 303 so that the output light that has been multiplexed is outputted through the emitting end 101b of the waveguide 101.

In the second multiplexing unit 303 where two red laser beams are multiplexed, the width of the waveguide 101 is made wider so as to provide an asymmetric structure. In the case where the second multiplexing unit 303 is formed of a directional coupler having a symmetric structure, light having the same wavelength that has been entered into the respective waveguides 101 and 104 crosses over to the opposite waveguides 104 and 101, and thus cannot be multiplexed. Therefore, it is necessary to break the symmetricity of the directional coupler so that light is transferred only to one waveguide. As an example of this, the width of the waveguide 101 is two times greater than the width of the waveguide 104 in the second multiplexing unit 303. As in the case described above, many other methods are possible to provide an asymmetric structure.

In Example 3 of the present invention, light having the same wavelength can be multiplexed in order to increase the output, and therefore, an application is possible to an image forming device that requires intense light such as an HUD (head-up display).

INDUSTRIAL APPLICABILITY

The multiplexer according to the present invention can be applied widely to apparatuses for projecting images where a plurality of visible light rays that are monochromatic rays are multiplexed, and thus, application is possible to a retina scanning type display where a retina of the user is scanned with multiplexed light rays for image projection and to a laser display that uses laser beam scanning for image projection.

REFERENCE SIGNS LIST 1a control unit
1b display unit
10 multiplexer
101 first waveguide
102 second waveguide
103 third waveguide
104, 105 bending unit
104a, 105a mirror
104b, 105b diffraction grating
104c, 105c curved portion
110 first multiplexing unit
120 second multiplexing unit
130 third multiplexing unit
16a, 16b, 16c semiconductor laser chip

The invention claimed is:

1. A multiplexer for wavelength multiplexing three visible light beams, at least one of which has a wavelength that is different from the other wavelengths, comprising:
a first waveguide, a second waveguide and a third waveguide into which the three visible light beams respectively enter; a plurality of multiplexing units that are provided in the middle of the first waveguide, the second waveguide and the third waveguide, and carry out mode coupling of the visible light beams that propagate through the first waveguide, the second waveguide and the third waveguide; and three laser light sources for emitting the visible light beams respectively into the first waveguide, the second waveguide and the third waveguide, wherein
a first multiplexing unit is provided in a location closest to at least two of the three laser light sources, the at least two of the three laser light sources have an optical axis in a location away from the axis lines through which the visible light beams that are introduced into the first multiplexing unit propagate so that the diffusion of the laser beams from the three laser light sources is prevented from affecting the first multiplexing unit so as not to generate stray light, and the two of the three optical axis is inclined relative to the axis lines through which the laser beams propagate so that the first multiplexing unit is not illuminated with the laser beams that spread at a predetermined spreading angle, and the outer peripheries of the laser beams pass in front of the first multiplexing unit,
the first waveguide is a linear waveguide, and
the first waveguide is arranged between the second waveguide and the third waveguide.

2. The multiplexer according to claim 1, wherein
a second multiplexing unit is provided at a rear stage of the first multiplexing unit,
the first multiplexing unit mode couples the visible light that propagates through the first waveguide and the visible light that propagates through the second waveguide, and
the second multiplexing unit mode couples the visible light that propagates through the first waveguide and the visible light that propagates through the third waveguide.

3. The multiplexer according to claim 2, wherein
the visible light that propagates through the first waveguide is red light,
the visible light that propagates through the second waveguide is blue light, and
the visible light that propagates through the third waveguide is green light.

4. The multiplexer according to claim 2, wherein
the visible light that propagates through the first waveguide and the visible light that propagates through the third waveguide have the same wavelength, and
the width of the first waveguide is wider in the second multiplexing unit than in the first multiplexing unit.

* * * * *